United States Patent [19]
Martin

[11] 3,799,691
[45] Mar. 26, 1974

[54] COUPLING DEVICE AND CENTRIFUGAL PUMP MAKING USE OF SAME

[75] Inventor: Louis E. Martin, Senlis, France

[73] Assignee: Societe Anonyme: Poclain, Le Plessie-Belleville, France

[22] Filed: Apr. 14, 1972

[21] Appl. No.: 243,960

[30] Foreign Application Priority Data
June 15, 1971 France .................. 71.21718

[52] U.S. Cl. ......... 415/104, 415/199 A, 415/213 R, 415/106
[51] Int. Cl. ...................... F04d 17/12, F04d 29/42
[58] Field of Search ....... 415/106, 199 A, 198, 213, 415/501, 104; 287/52 R; 192/65, 85 AT

[56] References Cited
UNITED STATES PATENTS

| | | | |
|---|---|---|---|
| 1,183,075 | 5/1916 | Kiefer | 415/106 |
| 1,642,914 | 9/1927 | Whann | 415/198 |
| 2,140,255 | 12/1938 | Rieske | 192/65 |
| 2,621,601 | 12/1952 | Stout | 415/198 |

FOREIGN PATENTS OR APPLICATIONS
178,633   3/1962   Sweden .................. 192/85 AT

*Primary Examiner*—Henry F. Raduazo
*Attorney, Agent, or Firm*—Flynn & Frishauf

[57] ABSTRACT

This invention relates to device for coupling a body with a drive shaft in rotation, constituted by an annular groove made in one of these elements, viz. body or drive shaft, and which receives an annular joint made of elastic material, whilst said annular joint has two axial faces which may be in contact with fluids at different pressures, and the radial expansion of said joint under the effect of the difference in pressure then ensures the seal between the body and the drive shaft, wherein said radial expansion ensures, in addition, the integration in rotation of the body and the drive shaft, the actions of the pressures of the fluids on said body having, as is known per se, a substantially zero resultant.

6 Claims, 2 Drawing Figures

COUPLING DEVICE AND CENTRIFUGAL PUMP MAKING USE OF SAME

The present invention relates to a device for coupling a body with a drive shaft in rotation and to centrifugal pumps applying the same.

When it becomes necessary to obtain a high delivery pressure, a centrifugal pump with several compression stages is generally chosen, the pressure increasing gradually from one stage to the next.

To make such a pump, it is necessary concomitantly to rotate each propulsion wheel, to integrate said wheel in translation with the drive shaft and, of course, to avoid undesired backflow of fluid under high pressure, delivered to the output of a compression stage, downstream of a given propulsion wheel, back towards the input of fluid in said stage, upstream of said wheel. The three above-mentioned conditions have been fulfilled only at the cost of complex and expensive productions, the phenomena of expansion which develop during operation further complicating the problem posed.

The invention is designed to remedy these disadvantages and to this end proposes a new type of centrifugal pump, in which the assembly of a propulsion wheel on the drive shaft is very simple, and moreover permits a substantial reduction in the clearances of assemblies, which had to be provided for beforehand.

The scope of application of the particular arrangement of the assembly proposed is, however, more general than the construction of centrifugal pumps.

Thus, the invention firstly has for an object a device for coupling a body with a drive shaft in rotation, constituted by an annular groove made in one of these elements, viz. body or drive shaft, and which receives an annular joint made of elastic material, whilst said annular joint has two axial faces which may be in contact with fluids at different pressures, and the radial expansion of said joint under the effect of the difference in pressure then ensures the seal between the body and the drive shaft.

Said radial expansion ensures in addition the integration in rotation of the body and the drive shaft, the action of the pressures of the fluids on said body having, as is known per se, a substantially zero resultant.

The difference in the pressures is, as is known, a function of the drive of the body by the shaft, and varies between a substantially zero value at the beginning of said drive and its maximum value, when this drive is terminated. The integration in rotation is therefore effected progressively. At the beginning of the drive in rotation, a slight axial clearance of the body with respect to the shaft is possible, whilst in addition, said shaft being supported in bearings integral with the structure, the said structure is provided with two axial support pieces opposite which are disposed two axial edges of said body and, still at the beginning of the drive, the body and shaft are assembled by possibly making use of said slight axial clearance by abutment of one of said axial edges on one of said axial support pieces.

The groove is preferably made in the body.

Furthermore, as is known, the joint generally presents, at assembly, a radial clearance with at least one of the two elements, between which it is interposed.

The invention also has for its object a centrifugal pump applying the above-mentioned coupling device, which comprises at least one propulsion wheel constituting said body and capable of being connected to the drive shaft of the pump, whilst a conduit places the periphery of said wheel in communication with a chamber, one of the walls of which is constituted by the face of the joint opposite the suction zone of the wheel.

This pump advantageously comprises at least two propulsion wheels corresponding to at least two compression stages, said conduit being constituted at least in part by the suction channel of the wheel corresponding to the second of the two compression stages. At least one of said propulsion wheels is disposed in the volute chamber of the pump, which then constitutes the structure with which the bearings of the shaft are integral, and which is provided with two opposite axial faces, forming support pieces. Said propulsion wheel is then disposed between said opposite axial faces and is delimited by its two axial edges, which are disposed opposite said opposite axial faces.

The invention will be more readily understood upon reading the following description with reference to the accompanying drawings, in which.

Figure 1:
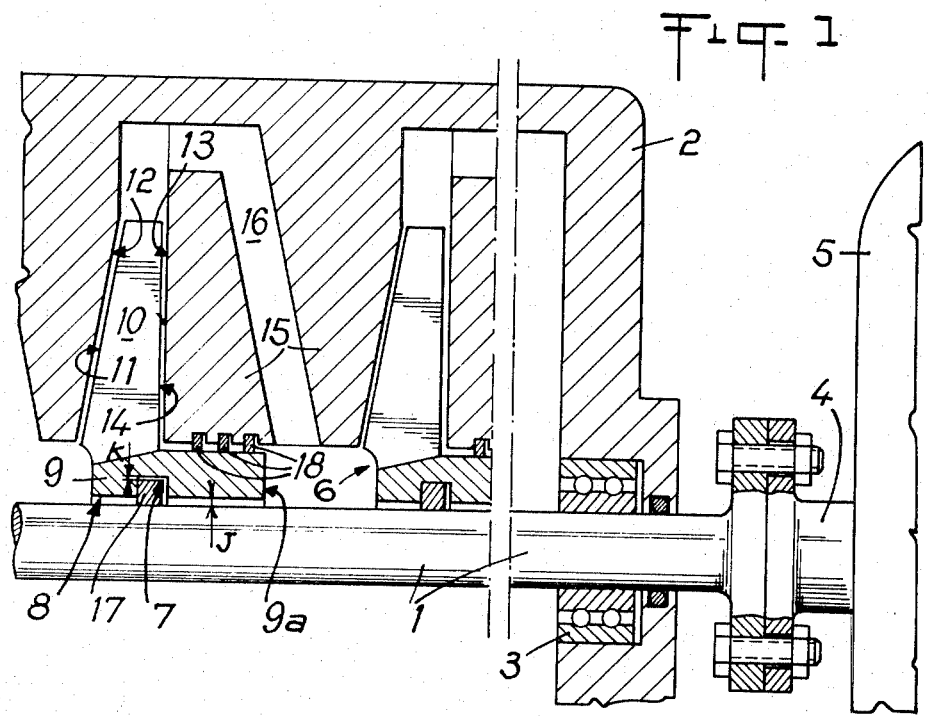
FIG. 1 is a partial axial section of a pump according to the invention.
Figure 2:
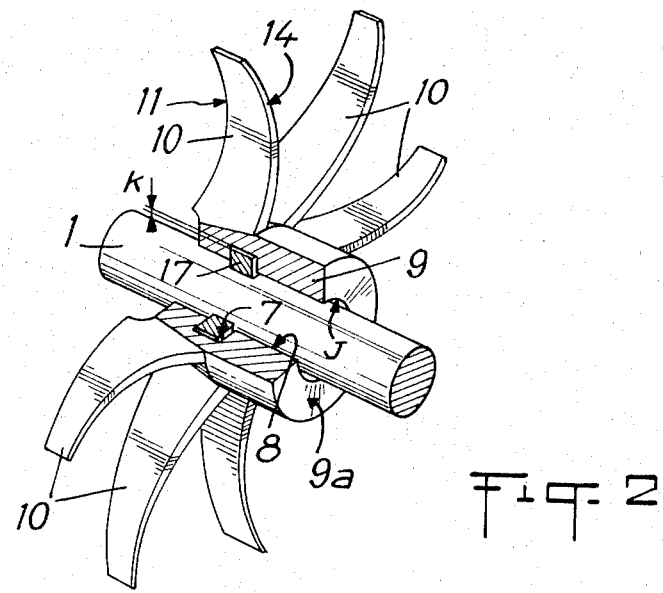
FIG. 2 is a partial perspective view of the pump of FIG. 1.

The application of the coupling device, which is given as example, is that of the assembly of the propulsion wheels of a centrifugal pump on their drive shaft.

The pump shown comprises a drive shaft 1, mounted to rotate in the pump body 2, by means of bearings 3. This shaft 1 is coupled, in known manner, to a drive member, such as the driven shaft 4 of a motor 5.

Propulsion wheels are placed in position on the shaft 1 and comprise a groove 7, which opens out into the bore 8 of the hub 9 of each wheel. Each wheel comprises a plurality of blades 10, fixed to the hub 9. It will be noted that the wheels shown are of the so-called balanced type, and in particular do not comprise any disc separating the front and rear faces of each wheel. Other types of balanced wheels exist, moreover, which could have been chosen. The front edges of the wheels are referenced at 11.

Each wheel is introduced into an enclosure comprising a front face 12, disposed opposite edges 11 of the blades, and a rear face 13, disposed opposite the rear edges 14 of said blades. The corresponding enclosure is itself delimited by discs 15, in whose thickness are arranged communication conduits 16 which, in the present case, open out into the rear faces 13 of the enclosure and connect this enclosure to the rear face 9a of the hub 9.

As is known, there is a radial clearance J between the bore 8 of the hub 9 and the shaft 1. Furthermore, a sealing joint 17 is introduced at assembly into the groove 7. The joint 17 is elastic and is initially disposed with a radial clearance K with at least one of the elements between which it is interposed, groove 7 or shaft 1, and is, in the present case, disposed with clearance opposite the groove 7. Moreover, the joint 17 may expand radially, under the effect of the difference in the pressures of the fluid present on either side of the wheel 6. After expansion, the joint 17 is in abutment in the inner bore of the groove 7 and on the outer cylindrical face of the shaft 1. These supports are, on the one hand, sealed and, on the other hand, sufficiently firm to integrate the wheel 6 with shaft 1, in rotation.

Finally, it will have been noted that a device, constituted in the present case by sealing joints 18, which are interposed between the bore of the discs 15 and the outer faces of the hub 9, ensures the seal between these two pieces.

The pump which has been described operates as described hereinafter.

In stop position, each wheel is in simple abutment by the bore 8 of its hub 9 on the shaft 1. However, it will be noted that it is in no way integral with said shaft 1, either in rotation, since a clearance J is made between the bore 8 and shaft 1 and a clearance K is also made between the joint 17 and the groove 7, or in translation, since there is no axial stop provided for this wheel.

When the shaft 1 is rotated, the wheels are firstly driven slightly in rotation by integration by means of the inevitable frictions existing between them and the shaft 1. The pressure increases along the blades 10 in the sense of the increasing radii, and, consequently, in conduits 16. Therefore, the joint 17 is compressed axially, and expands radially and abuts more and more firmly on the inner bore of the groove 7 and on the shaft 1.

Before the complete integration of the wheel with the shaft 1, the edges 11 and 14 of the blades rub on the faces 12 and 13 of the discs 15, this having for an effect to place the wheels in the corresponding enclosures in correct operational position after expansion. It is in this way that the clearances between the edge 11 and face 12 on the one hand, and between the edge 14 and face 13 on the other hand may be reduced as much as possible, this leading to a good yield of compression, which was impossible to obtain before, since the operational clearances varied between the stop position and the operational position and had to be made too large in operation.

Finally, with each wheel correctly placed in position, and rotation continuing, integration is effected both in rotation and in translation between the wheels and shaft 1. Concomitantly, the seal is effected between the upstream and downstream faces of the hub 9 of each wheel, at the level of the shaft 1. This integration is of course a function of, and varies in the same sense as, the difference in pressures upstream and downstream of the wheel in question.

There is the additional advantage of having a locking torque limitation of the rotating shaft 1-and-wheels assembly, with respect to the pump body 2, the effect of integration of each wheel with the shaft 1, by means of the joint 17, being annulled in the case of considerable locking. However, it will have been noted that, in order to enable the difference in pressure, mentioned above, to be produced, it was necessary to avoid the transfer of downstream fluid at high pressure, towards the upstream of each hub 9, which is at low pressure. This is why the joints 18 have been provided, in order to ensure the seal between the upstream and the downstream parts of the hub 9. Furthermore, it is also necessary to apply the above-mentioned assembly only in the case of a body with balanced pressure, in order, this time, to avoid a displacement of said body in a given sense and to hinder the satisfactory positioning of this body, constituted in the present case by the propulsion wheel.

It will, of course, have been noted that the assembly is extremely simple, in particular it eliminates the formerly necessary specific means of integration (keys, pins), and prior adjustments by thick wedges or like means.

The invention is not limited to the embodiment that has just been described, but covers on the contrary all the variants that may be made thereto without departing from its scope.

In particular, the groove, which receives the joint 17, may obviously be arranged in the shaft 1 itself.

The invention may be applied in particular to the production of centrifugal pumps having several compression stages, but advantageously to the production of pumps comprising a large number of compression stages, as the problems raised by the machining and assembly tolerances are very difficult to solve for this type of pump when said latter is made according to prior known techniques.

In describing the joint member 17, its faces which are the end faces in the axial direction, that is, are disposed vertically in FIG. 1 to the left and right, are referred to as the "axial faces" and, likewise, the edges 11 and 14 of the impeller structure 10 are referred to as the axial edges, because they define the axial extremity of the body. Similarly, the edges 12 and 13 of the structure 2 of FIG. 1 are described as providing axial support, which of course they do, since they provide support against excessive axial movement of the body 10, so that the structures bearing the edges 12 and 13 may likewise be referred to as axial supports.

What is claimed is:

1. Device for coupling a body with a drive shaft in rotation, comprising:
   an annular groove made in one of these elements, viz. body or drive shaft, opposite a surface of revolution of the other of these elements;
   an annular joint means made of elastic material, located partly in said groove and having two axial faces at least partly clear of said body and said drive shaft for exposure to pressure of a fluid medium;
   means for creating a pressure differential at opposite sides of said joint means, said means including a
   pressure generating means driven by said body for subjecting a fluid medium to pressure varying with the drive between the body and the shaft, so arranged as to create a difference in pressure between the fluid medium in contact with one axial face of said joint means and the fluid medium in contact with the other axial face of said joint means,
   whereby an axial pressure difference on said joint means presses said joint means against a side of said groove to produce a radial expansion of said joint means and thereby to complete and ensure the seal between said body and said drive shaft and then to ensure the integration in rotation of the body and the drive shaft.

2. Coupling device as claimed in claim 1, wherein the aforesaid surface of revolution is cylindrical, wherein also the difference in pressures of said fluid medium on the respective axial faces of said joint means varies from substantially zero at the beginning of said drive to progressively higher values as said drive continues, thereby progressively effecting said integration in rotation, wherein also, at the beginning of rotation, a slight axial displacement of the body with respect to the shaft is possible, and wherein said shaft is supported in bearings integral with a structure which includes two axial support pieces opposite which are disposed two axial edges of said body disposed so that said fluid medium is present in the clearances therebetween and serving to guide said body into a suitable position just prior to said integration.

3. Coupling device as claimed in claim 1, wherein the groove is made in the body.

4. Coupling device as claimed in claim 1, wherein, in manner known per se, the joint has at assembly a radial clearance with at least one of the two elements between which it is interposed.

5. Centrifugal pump comprising the coupling device as claimed in claim 1, and comprising also at least one impeller wheel, constituting said body, bearings for said shaft, and a structure supporting said bearings and having also means establishing a chamber for said impeller wheel and conduit means providing communication for said fluid medium between the periphery of said impeller wheel with a chamber, one of the walls of which is constituted by that face of said joint means which is on the side of said joint means opposite the suction zone of the wheel.

6. Contrifugal pump as claimed in claim 5, wherein a said impeller wheel is so constituted that the difference in the pressure on axial sides of said joint means varies from a substantially zero value at the beginning of said drive to progressively higher values as said drive continues, thereby progressively effecting said integration in rotation, wherein also at the beginning of the rotation, a slight axial displacement of the body with respect to the shaft is possible, wherein also said shaft is supported in bearings integral with a structure, including two axial support peices opposite which are disposed two axial edges of said body, disposed so that said fluid medium is present in the clearances therebetween and serving to guide said body into a suitable position for integration with said shaft, wherein also said centrifugal pump comprises at least two impeller wheels corresponding to at least two compression stages, wherein also said conduit leading from the periphery of the impeller wheel of a previous stage is constituted at least in part by the suction channel of the wheel corresponding to the next following stage, wherein also said pump comprises a volute chamber in which at least one of said impeller wheels is disposed, said volute chamber constituting the structure with which the bearings of the shaft are integral and which is provided with two opposite axial faces, forming support pieces, between which said impeller wheel is disposed.

* * * * *